July 8, 1952     W. H. CHURCH     2,602,680
SHUTDOWN SEAL CONTROL FOR ELASTIC FLUID COMPRESSORS
Filed April 25, 1950
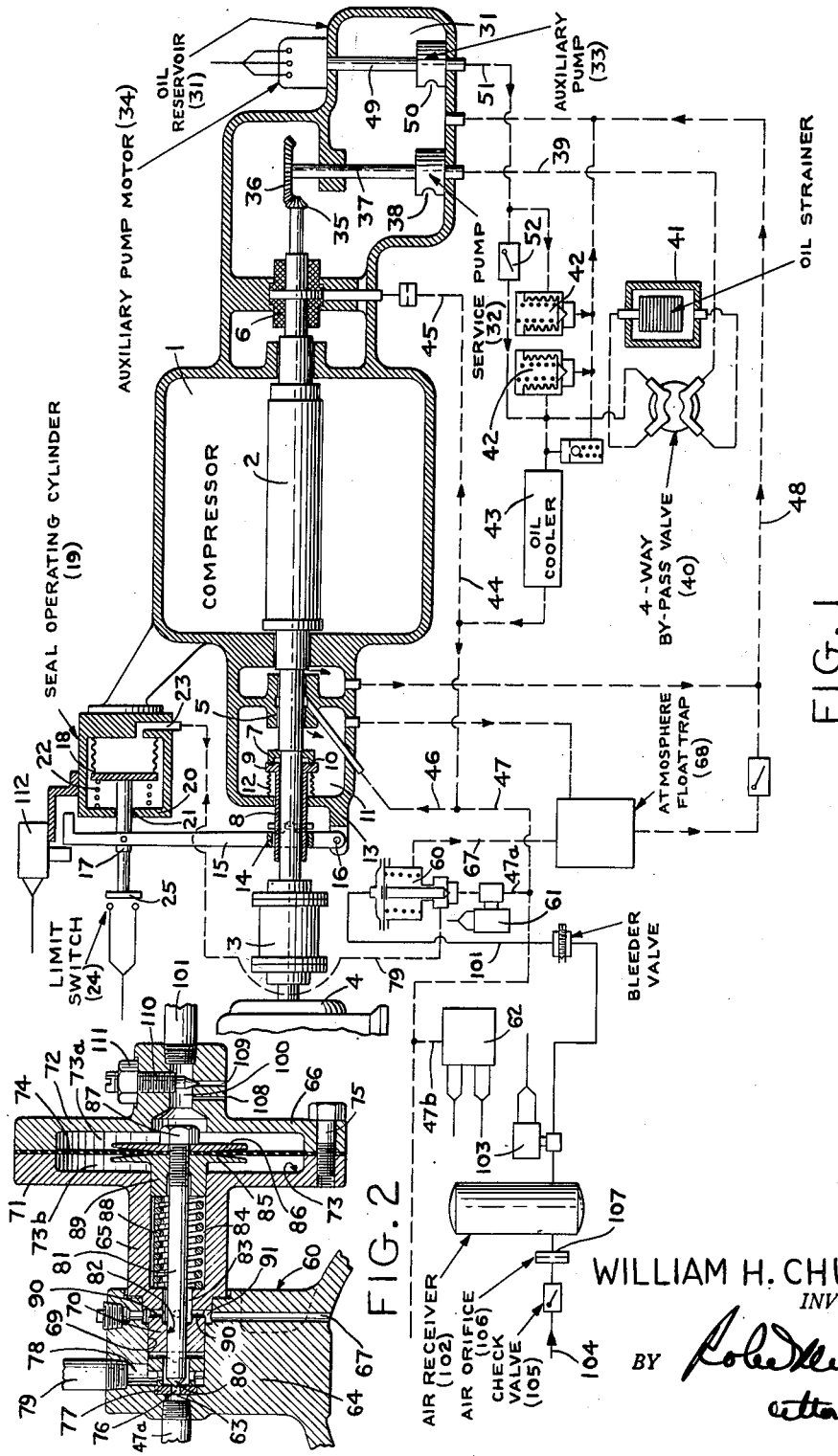
WILLIAM H. CHURCH
INVENTOR.

Patented July 8, 1952

2,602,680

UNITED STATES PATENT OFFICE 2,602,680

SHUTDOWN SEAL CONTROL FOR ELASTIC FLUID COMPRESSORS

William H. Church, Jersey City, N. J., assignor to Worthington Pump and Machinery Corporation, Harrison, N. J., a corporation of Delaware Application April 25, 1950, Serial No. 158,015

10 Claims. (Cl. 286—9)

This invention relates generally to elastic fluid compressors and more particularly to an air valve control for operating the shut down seal therein where complete failure of the main service pump and the auxiliary oil pump occurs.

While it is not intended to so limit the present invention, it is particularly applicable to centrifugal compressors utilized in refrigerating apparatus for compressing the vapors of volatile liquid refrigerant such, for example, as trichlorofluoromethane, methylene chloride, etc.

In centrifugal compressors to prevent gas loss usually the compressors are designed whereby gas leakage occurs only along the rotor. Accordingly, means are further provided to prevent gas leakage along the shaft by providing an inner seal when the compressor is operating and an outer seal for shut down periods or when emergency shut down occurs, the inner seal and outer seal generally being operated in conjunction with a lubricating system which includes a lubricant pump operated off the rotor. In addition, for starting up and shutting down, and in the event of pressure reducing below a predetermined minimum in the lubrication system, an auxiliary pump is generally provided to maintain the lubricant pressure in the lubrication system and to maintain the pressure a given period of time to prevent the outer seal from closing before the compressor is at rest.

It has been found that if auxiliary pump failure occurs, when the main pump is not in operation or total power failure occurs, the lubricant pressure will immediately drop causing the shut down seal to close before the compressor has come to rest resulting in the seal being damaged and, as a consequence thereof, providing an escape outlet for the fluid in the compressor and further necessitating immediate replacement of the shutdown seal to eliminate this dangerous hazard.

The present invention contemplates a novel construction which provides means for controlling the closing of the shut down seal where the main and the auxiliary pumps fail with the power on and in addition where total power failure occurs, provides air pressure means for coacting with said means, to maintain said shut down seal open until the compressor is at rest and only allows the shut down seal to close in a safe manner without damage to the seal.

Accordingly, it is an object of the present invention to provide means for controlling the closing of the shut down seal whereby it will be timed to close after the compressor comes to rest.

It is another object of the present invention to provide means for maintaining the shut down seal open under varying emergency conditions such as where both the main pump and the auxiliary pump fail while the power remains on, or when total power failure or other similar condition arises in the operation of the compressor.

With these and other objects in view, as may appear from the accompanying specification, the invention consists of various features of construction and combination of parts, which will be first described in connection with the accompanying drawing, showing a shut down seal control for elastic fluid compressors of a preferred form embodying the invention, and the features forming the invention will be specifically pointed out in the claims.

In the drawings:

Figure 1 is a diagrammatic sketch of a typical compressor system including the invention.

Figure 2 is a cross-section of one type of air operated valve, used in the present invention.

Referring more particularly to the drawings, Figure 1 illustrates a typical compressor system showing generically a compressor casing 1 having a rotor shaft 2 extending through said casing connected by a coupling 3 to step up gears 4 which are in turn connected to a prime mover (not shown), being any suitable type for operating the compressor 1. The step up gears may also be any suitable type easily purchasable on the open market and are therefor generically indicated. The rotor shaft 2 provided for the compressor has a line bearing 5 at one end and thrust bearing 6 at the other end to allow for relatively frictionless rotation of the rotor shaft 2 during operation.

The shut down seal system is indicated in the drawing at the line bearing end of the rotor shaft 2. It is understood that while this type of shut down seal system is shown that any other suitable type of fluid operated shut down seal system would suffice to describe this invention.

Accordingly, Figure 1 shows a sealing collar 7, which is an annular structure fixedly mounted on the rotor shaft 2. A sealing sleeve 8, a substantially hollow cylindrical structure, is slidably mounted about the rotor shaft 2 for movement towards and away from the sealing collar 7. At its inner aspect it is provided with a sealing face 9 having a sealing insert 10, of suitable resilient material which will engage the sealing collar 7 in fluid tight relationship when the sealing sleeve 8 is moved towards the sealing collar 7. When the sealing insert 10 is thus in contact with the sealing collar 7, the shut down seal is closed and refrigerant gases are prevented from escaping from the end chamber 11, in which the members lie to atmosphere about the rotor shaft 2. A Sylphon bellows 12, which is a tube-like resilient structure is further provided between the back plate 13 of the end chamber 11 and the sealing face 9 to prevent gases escaping from the end chamber 11 through the opening provided to allow the rotor shaft 2 with the sealing sleeve 8 mounted thereabout to pass therethrough.

The sealing sleeve 8 extends along the rotor shaft 2 through the back plate 13 to contact in pivotal engagement an annular portion 14 of a lever 15.

Lever 15 lies perpendicular to the axis of the rotor shaft 2 and pivots on a fulcrum 16 at one end. And the other end is pivotally connected to a piston rod 17. Piston rod 17 is fixedly connected to a seal operating piston 18 and is fixedly attached for slidable movement therewith, the seal operating piston 18 being reciprocatable in a seal operating cylinder 19 mounted on the compressor, as is clearly shown in Figure 1 of the drawings.

Seal operating cylinder 19 is substantially cylindrical in shape and lies so that its axis is in a parallel plane with that of the rotor shaft 2. The rear portion 20 of the cylinder 19 is provided with an opening and bearing structure 21 for the passage of the piston rod 17 therethrough to the seal operating piston 18. Mounted concentrically about the piston rod 17 and between the seal operating piston 18 and the rear portion 20 of the cylinder 19 is a resilient spring member 22 which normally maintains the piston in a forward position in the cylinder. The seal operating cylinder 19 is provided forwardly of this normal position of the piston member 18 with a seal operating cylinder inlet port 23 whereby high pressure lubricant from the lubrication system to be hereinafter described may be forced into the seal operating cylinder 19 to force the piston member rearwardly against the resilient spring member 22.

A safety or limit switch 24, also indicated in Figure 1, is operated from the outer end 25 of the piston rod 17. When the piston 18 is forward in the cylinder 19, the limit switch will be open and the prime mover (not shown) operating therethrough cannot be started. However, when the piston member 18 is moved rearwardly by the action of the high pressure lubricant as hereinafter described the piston rod 17 will in turn be moved whereby the outer end 25 will make contact with the limit switch 24 to allow the prime mover (not shown) to be placed in operation.

Movement of the piston rod 17 will in turn cause the lever arm 15, and the sealing sleeve 8 connected thereto to be moved back and forth whereby the sealing insert 10 will engage and disengage the sealing collar 7 all of the above being clearly shown in Figure 1 of the drawings.

The operation and control of the seal operating cylinder 19 which in turn controls the operation of the shut down seal system as above described is best described in connection with both the lubrication system, also indicated in Figure 1 of the drawings and the controls cooperatively connected into the lubrication system to accomplish the desired purpose. It is understood that while this type of lubrication system is shown that any type system which will supply fluid at high pressure for the operation of the seal operating cylinder may be utilized with the air valve control system, shown herein and hereafter described.

Accordingly, beginning at the thrust bearing end of the compressor, the end of the rotor shaft 2 extends into a fully enclosed reservoir or oil sump 31, having a service pump 32 and an auxiliary pump 33 therein for supplying oil or other lubricant at high pressure to the lubrication system.

Auxiliary pump 33 is drawn by an electric motor 34 and is utilized to provide lubricant at high pressure to the lubrication system when starting up and shutting down and in case of failure of the service pump 32, to supply lubricant at a pressure above a predetermined minimum setting. An automatic pressure switch (not shown) starts the auxiliary pump when the oil pressure from the service pump falls below the predetermined minimum setting.

Figure 1 further shows the rotor shaft 2 having a bevel gear 35 at the end thereof which drives a second bevel gear 36 fixedly connected to a shaft 37 which is in turn connected to the service pump 32. Therefore, as the rotor shaft 2 turns it drives the bevel gears 35 and 36 driving the shaft 37 which in turn drives the service pump 32. Oil or other suitable lubricant is thus drawn from the reservoir or oil sump 31 into opening 38 in the service pump 32 and discharged from the service pump 32 at high pressure into a conduit 39. Thereafter the oil is forced through the first stage of a four-way by-pass valve 40 into an oil strainer 41 whence it is returned to the second stage of the by-pass valve 40. A portion of the lubricant passing from the second stage of the by-pass valve 40 will pass to an oil pressure control 42 provided to by-pass a quantity of oil back to the reservoir during operation of either the service pump 32 or the auxiliary pump 33 to maintain a constant predetermined pressure maximum at the discharge sides of the pumps. The remaining portion of the lubricant passing out of the second stage of the by-pass valve 40 will pass through an oil cooler 43 and then to the main high pressure supply line 44 whence various conduits as shown at 45, 46 and 47, connected thereto pass the lubricant to the various portions of the compressor which utilize the high pressure lubricant such as the thrust bearing 6, line bearing 7 and shut down seal system, etc.

The high pressure lubricant is returned from these various portions not forming part of the present invention by gravity flow to the low pressure line 48 which conducts it to the reservoir or oil sump 31.

Auxiliary pump 33 utilized for starting up and shutting down in case of failure of the service pump 32, also shown in Figure 1, is connected to the electric motor 34 by a shaft 49. The electric motor which may be operated manually or made automatically responsive to the pressure supplied by the service pump 32. When the electric motor 34 is in operation it causes the pump to draw lubricant from the reservoir through an opening 50 therein which is forced out at high pressure through line 51. Line 51 will allow a portion of the fluid to pass through the oil pressure control 42 above described to allow a certain portion of the fluid to by-pass back to the reservoir. The remaining portion of the fluid will pass through check valve 52 directly to the oil cooler member 43 where the flow of fluid is identical with the flow through the oil cooler as above described.

The shut down seal control receives the high pressure lubricant through an air control system which operates in response to the change in pressure in the lubrication system.

Thus high pressure line 47 which receives high pressure fluid from the main high pressure line 44 leads to a conduit 47a in turn connected to an air valve 60 hereinafter described.

In the conduit 47a a solenoid oil valve 61 is positioned to be opened or closed to allow high pressure fluid to flow through conduit 47a. Solenoid oil valve 61 is normally open (no current flowing therethrough) and is operated in response to a pressure switch 62 connected to line 47b which receives high pressure fluid also from high pressure line 47. Pressure switch 62 is connected in the same electrical circuit with the solenoid oil valve 61 and is set so that when the fluid pressure in line 47b reaches a predetermined minimum setting the current to the solenoid oil valve 61 will be broken, deenergizing the solenoid oil valve 61 whereby it will be open to allow fluid to pass therethrough to the air valve 60. It is believed that it is obvious that when the pressure drops below the predetermined minimum that the circuit to the solenoid valve 61 will be closed causing it to energize and close the valve in the conduit 47a whereby flow therethrough is prevented. Solenoid oil valve 61 and pressure switch 62 may be of any suitable type of which there are many easily purchasable on the open market.

*Air valve member*

Air valve 60 is threadably connected to conduit 47a by inlet port 63 as is clearly shown in Figure 2 of the drawing, and includes, a connecting base 64, a middle body portion 65 and a cover portion 66.

Connecting base 64 is a substantially cylindrical member adopted to be connected to the compressor whereby return passage 67 therein will deliver returning fluid to the reservoir or sump 31, or to the common return line 48 where it will be conducted to the reservoir, or as shown in Figure 1 of the drawings to the float trap 68, whence it then passes to the common return line 48 to be passed back to the reservoir 31.

Connecting base 64 is further provided with a cylindrical bore 69, into which is fitted in fluid tight relationship a cylindrical projection 70 on the lower portion of the middle body portion 65.

The middle body portion 65 is a substantially cylindrical member, having an enlarged cup-shaped flange 71 at the outer end thereof which engages a second cup-shaped flange 72 formed on the annular cover member 66 whereby a chamber 73 is formed in this portion of the air valve 60. Adapted to be held between the flanges 71 and 72 is a diaphragm member 74 made of rubber or other suitable material which, in the assembled position, will be held in the medial plane of the chamber 73 by suitable threaded means such as bolts 75. The chamber 73 will thus be divided into an air tight upper chamber 73a and fluid tight lower chamber 73b, all of which is clearly shown in Figure 2 of the drawings.

Inlet port 63 enters the connecting base 64 in the axial line of the cylindrical bore 69 and communicates with a valve port 76 formed in a valve seat 77 fitted into the base of the cylindrical bore 69 between the bore 69 and the inlet port 63 whereby the valve port 76 will provide communication therebetween. An exhaust port 78 is provided in the side wall of the cylindrical bore 69 above the valve port 76 which is threadably connected to a conduit 79 leading to the seal operating inlet port 23 above described, which acts to conduct the lubricant fluid both towards and away from the seal operating cylinder.

Valve port 76 is engaged and closed by a needle valve head 80, formed integrally at the inner end of an elongated valve stem 81 extending through a valve guide bore 82, intermediate chamber 83, and enlarged chamber 84 formed in the middle body portion 65, to pass through the diaphragm member 74 to which it is connected in air tight relationship by means of a lower coupling portion 85 threadably mounted on the elongated valve stem 81 below the diaphragm 74, and an upper coupling portion 86 which squeezes the diaphragm therebetween when the nut member 87 is threaded into the end of the valve stem 81 into tight abutment with the upper coupling portion 86. All of the above being clearly shown in Figure 2 of the drawings.

Valve port 76 will be normally maintained open by a valve spring 88, which is mounted concentrically about the valve stem 81, in the enlarged chamber 84, abutting the inner end thereof on one side, and on the outer end, a projection 89 formed on the lower coupling 85. The projection 89 is slidably mounted in the outer end of enlarged chamber 84, and will compress the valve spring 88, when as hereinafter described air pressure acting in the upper chamber 73a against the diaphragm member 74 will move the valve stem 81 and the upper coupling 85 inwardly, causing the valve head 80 to close the valve port 76.

When valve port 76 is thus closed, any back pressure in line 79 will tend to force lubricant operating fluid along the valve stem 81 to the intermediate chamber 83.

Intermediate chamber 83 is connected by transverse passages 90 radially spaced in the projection 70 to an annular chamber 91, formed in the upper part of the cylindrical bore 69, which in turn communicates with the return passage 67. Thus any lubricant fluid forced along the valve stem 81 to the intermediate chamber 83 will pass by differential pressure from the intermediate chamber 83 through the transverse passage 90 into the annular chamber 91 and thence through the return passage 67 to the reservoir or sump 31, as above described.

*Means for delivering air pressure to the air valve*

Upper chamber 73a formed in the air valve 60 communicates by an air inlet port 100 in the cover member 66, with an air conduit 101 threadably connected thereto as shown in Figure 2.

Air conduit 101 is in turn connected to an air receiver or reservoir 102 through a solenoid air valve 103. Air receiver 102 may be any suitable type of compressed air storage tank, which are well known in the art and easily purchasable on the open market.

Solenoid valve 103 may also be any suitable type which will be normally open when there is no current passing therethrough. However, whenever the power is on and current is flowing therethrough it will be closed, thus preventing air under pressure in the air receiver 102 from flowing through the air conduit 101 to the air inlet port 100 and the upper chamber 73a, as is clearly shown in Figures 1 and 2 of the drawings.

The air pressure in air receiver 102 will be maintained at some suitable predetermined pressure sufficient to close the air valve 60 whenever the solenoid valve 103 is opened, by a suitable compressing means (not shown) which may be operated either off some portion of the compressor or rotor shaft 2 or separately by a separate prime mover suitable therefor.

The compressing means (not shown) is connected by a suitable connecting conduit 104 in which is provided an air check valve 105 and an air orifice 106. Air orifice 106 may be any suitable type of constricting means across some portion of the connecting conduit 104 between the check valve 105 and the air receiver 102, such as a steel plate with a sized opening 107 which will limit the amount of air delivered to the air receiver 102 after the solenoid air valve 103 is opened, such that the amount of air delivered to the air receiver will be less than the amount of air bled out through the bleeder openings 108 and 109, shown on the air valve 60 in the cover member 66 thereof, and provide communication with atmospheric pressure through the air inlet part 100 to the upper chamber 73a. It being understood that while these bleeder openings are shown in the cover member 66, in the preferred form, it is obvious that they may be placed anywhere along the conduit 101 between the solenoid air valve 103 and the air valve 60 to effect this result.

To regulate the amount of air bled out of upper chamber 73a, bleeder opening 109 is provided with a needle-like bleeder screw 110 for engagement therewith, to regulate the size of the opening, and a bleeder screw locking nut 111 to hold it in this position. This will be important as hereinafter described to allow the air valve 60 to be timed to open so as to correlate with the speed of the rotor shaft 2, so that the shut down seal will not close until the compressor has come to rest.

Operation

In operation, when the power is turned on current passes to a locking switch 112 causing it to raise, and to both solenoid valves 61 and 103 causing them to energize and accordingly close.

Auxiliary pump motor 34 may then be started, driving shaft 49 and the auxiliary oil pump. Thus lubricant fluid will be drawn from the reservoir 31 into opening 50 and discharged into line 51 under pressure. It passes through line 51, check valve 52 and oil cooler 43 to the high pressure line 44, whence it is passed to the respective conduits 45, 46 and 47 as above described.

High pressure lubricant in line 47 passes to conduits 47a and 47b. However, until the pressure acting therein reaches a predetermined minimum, the pressure switch 62 will not be activated to open the solenoid oil valve 61 by opening the circuit thereto. However, when the predetermined minimum pressure is reached the pressure switch 62 opens the circuit to the solenoid oil valve 61 which allows lubricant fluid under high pressure to flow to the air valve 60. Since the solenoid air valve 103 is closed, only atmospheric pressure will be acting against the diaphragm member 74 through the bleeder opening 108 and accordingly the air valve will be held open by the spring member 88, allowing lubricant fluid to pass through the inlet port 63, valve port 76, into the cylindrical bore 69, and out through the outlet port 78, to the conduit 79. Thereafter it passes to the seal operating cylinder inlet port 23 and into the cylinder 19 to act against the piston member 18, forcing the piston member 18, outwardly, and as above described causing the shut down sealing sleeve 8 to move out of contact with the collar 7. The limit switch is also closed so that prime mover (not shown) driving the compressor may be started.

After the compressor is started, the rotor shaft 2 will drive the main service pump 32, and when a predetermined minimum pressure is reached the circuit to the auxiliary pump motor 34 will be automatically opened allowing the auxiliary pump 33 to stop. However, it is understood that if the pressure drops below the predetermined minimum the circuit to the auxiliary pump motor 34 will be closed and cause the auxiliary oil pump 33 to again start operating.

As long as the lubricant fluid pressure remains above the predetermined minimum pressure necessary to maintain the circuit to the solenoid oil valve 61 open, lubricant fluid under pressure will be acting against the piston 18 in the shut down seal cylinder 19 and maintain the shut down seal 10, open and out of contact with the collar 7.

Where, however, failure of both the main service pump and the auxiliary oil pump occurs, with the power on, the pressure switch 62 responsive to the pressure in line 47b, will close the circuit to the solenoid oil valve 61, energizing it and causing the valve to close which prevents lubricant fluid in line 79 from returning through the air valve 60 through line 47a to line 47 as the pressure reduces in these lines.

Accordingly, with the solenoid oil valve 61 closed the lubricant fluid will have a certain amount of back pressure which will prevent the piston member 18 from moving forwardly in the seal operating cylinder 19, thus maintaining the shut down seal 10 open. In addition, the clearance between the valve stem 81 and the valve guide bore 82, will be such that the lubricant fluid may bleed slowly along the valve stem 81 to the intermediate chamber 83 and thence to the return passage 67 as above described so that the shut down seal sleeve 8 will move slowly inwardly as the pressure reduces, the timing thereof being regulated in accordance with the time required to bring the compressor to rest as the reduction in lubricant pressure will cause the prime mover (not shown) to stop driving the compressor as soon as the limit switch 24 opens.

Where failure of, both the main service pump 32 and the auxiliary pump 33, and the power fails, both solenoid valves 61 and 103 will open.

As soon as solenoid valve 103 opens, air pressure will pass from conduit 101 to an inlet port 100 into chamber 73 where it will act against the upper surface of the diaphragm member 74 forcing it downwardly which in time forces the valve stem 81 and the valve head 80 downwardly closing the valve port 76, and compressing the spring member 88 as above described. This prevents the lubricant fluid from passing through the air valve 60 to the conduit 47a and thence to 47 as the pressure reduces in the system, and accordingly the seal operating cylinder will under these conditions have sufficient pressure acting against piston member 18 to maintain the shut down seal 10 open.

The air in receiver 102 begins to bleed off through bleeder means 108 and 109 faster than it can enter 102 thereby reducing air pressure in chamber 73. After a time greater than required for the compressor to stop rotating this air pressure will be sufficiently low to allow spring 88 to open valve port 76 so lubricant can return to system through line 47 and allow shut down seal insert 10 to make contact with seal collar 7.

The compressor is at rest before the aforesaid contact is made.

While one form of this invention has been illustrated and described, it is understood that the invention is not to be limited to the specific construction or arrangement of parts shown, but that they may be widely modified within the invention defined by the claims.

What is claimed is:

1. In a control for a shut down seal system on elastic fluid compressors operated by a lubrication system thereon having a main service pump and an auxiliary pump including, a casing, a rotor shaft extending through said casing, a seal collar fixedly connected to said rotor shaft, a shut down seal movably mounted on said rotor shaft for air tight engagement with said seal collar, a lever pivotally connected to said shut down seal for moving it into and out of engagement with said seal collar, cylinder and piston elements in said compressor for operating said lever responsive to the lubricant pressure in said lubrication system, a conduit for conducting lubricant fluid to and from said lubrication system to said cylinder element, and an air valve connected in said conduit maintained normally open, the combination with said air valve of, means in said conduit to prevent fluid from returning to the lubrication system when the pressure in said lubrication system drops below a predetermined minimum, and means in the air valve coacting with said means in the conduit for allowing said lubricant fluid to return slowly through the air valve when the pressure drops below the predetermined minimum to allow the compressor to be brought to rest before the shut down seal closes.

2. In a control for a shut down seal system on elastic fluid compressors operated by a lubrication system thereon having a main service pump and an auxiliary pump including, a casing, a rotor shaft extending through said casing, a seal collar fixedly connected to said rotor shaft, a shut down seal movably mounted on said rotor shaft for air tight engagement with said seal collar, a lever pivotally connected to said shut down seal for moving it into and out of engagement with said seal collar, cylinder and piston elements on said compressor for operating said lever responsive to the lubricant pressure in said lubrication system, a conduit for conducting lubricant fluid to and from said lubrication system to said cylinder element, and an air valve connected in said conduit maintained normally open, the combination with said air valve of, means for delivering sufficient air pressure to immediately close said air valve to prevent the return of fluid through said conduit when complete power failure occurs, and means for equalizing said air pressure to allow said air valve to open in accordance with the predetermined time required for the compressor to come to rest before the shut down seal closes.

3. In a control for a shut down seal system on elastic fluid compressors operated by a lubrication system thereon having a main service pump and an auxiliary pump including, a casing, a rotor shaft extending through said casing, a seal collar fixedly connected to said rotor shaft, a shut down seal movably mounted on said rotor shaft for air tight engagement with said seal collar, a lever pivotally connected to said shut down seal for moving it into and out of engagement with said seal collar, cylinder and piston elements on said compressor for operating said lever responsive to the lubricant pressure in said lubrication system, a conduit for conducting lubricant fluid to and from said lubrication system to said cylinder element, and an air valve connected in said conduit maintained normally open, the combination with said air valve of, means in said conduit to prevent fluid from returning to the lubrication system when the pressure in said lubrication system drops below a predetermined minimum with the power on, means for delivering sufficient air pressure to immediately close said air valve to prevent the return of fluid through said conduit when the pressure in said lubrication system drops below a predetermined minimum and there is a complete power failure, means coacting with said means for delivering air pressure for equalizing said air pressure to allow said air valve to open, and means coacting with each of the above mentioned means for allowing the lubricant fluid to return to said lubrication system to allow the compressor to come to rest before said shut down seal closes.

4. In a control for a shut down seal system on elastic fluid compressors operated by a lubrication system thereon having a main service pump and an auxiliary pump including, a casing, a rotor shaft extending through said casing, a seal collar fixedly connected to said rotor shaft, a shut down seal movably mounted on said rotor shaft for air tight engagement with said seal collar, a lever pivotally connected to said shut down seal for moving it into and out of engagement with said seal collar, cylinder and piston elements on said compressor for operating said lever responsive to lubricant fluid under pressure from said lubrication system, a conduit for conducting lubricant fluid under pressure to and from said cylinder element and an air valve comprising, inlet means formed on said valve and connected in said conduit, a cylindrical bore in said valve communicating with said inlet means through a valve port, outlet means from said cylindrical port and connected to said conduit, a valve guide in said bore and having an elongated valve stem slidably mounted therein, said valve stem provided with a valve head at one end for engagement with said valve port, resilient means mounted about said valve stem for maintaining said valve port normally open, a chamber in said air valve provided with a diaphragm thereacross and connected to the other end of said valve stem for moving said valve head into engagement with said valve port responsive to air pressure delivered to said chamber on at least one side of said diaphragm, the combination with said air valve of, a solenoid valve in said conduit on the upstream side of said valve for closing said conduit to prevent lubricant fluid from returning when the pressure in the lubrication system drops below a predetermined minimum when the power is on, and return means formed in said air valve to coact with said solenoid valve to allow the lubricant to be returned slowly to the lubrication system so that the shut down seal will close in accordance with the stopping time of said compressor.

5. In a control for a shut down seal system on elastic fluid compressors operated by a lubrication system thereon having a main service pump and an auxiliary pump including, a casing, a rotor shaft extending through said casing, a seal collar fixedly connected to said rotor shaft, a shut down seal movably mounted on said rotor shaft for air tight engagement with said seal collar, a lever pivotally connected to said shut down seal for moving it into and out of engagement with said seal collar, cylinder and piston elements on said compressor for operating said lever responsive to lubricant fluid under pressure from said lubrication system, a conduit for conducting lubricant fluid under pressure to and from said cylinder element and an air valve comprising, inlet means formed on said valve and connected in said conduit, a cylindrical bore in said valve communicating with said inlet means through a valve port, outlet means from said cylindrical port and connected to said conduit, a valve guide in said bore and having an elongated valve stem slidably mounted therein, said valve stem provided with a valve head at one end for engagement with said valve port, resilient means mounted about said valve stem for maintaining said valve port normally open, a chamber in said air valve provided with a diaphragm thereacross and connected to the other end of said valve stem for moving said valve head into engagement with said valve port responsive to air pressure delivered to said chamber on at least one side of said diaphragm, the combination with said air valve of, a solenoid valve in said conduit on the upstream side of said valve for closing said conduit to prevent lubricant fluid from returning when the pressure in the lubrication system drops below a predetermined minimum when the power is on, and return means in said air valve to coact with said solenoid valve including, an intermediate chamber formed in said valve guide about said valve stem to receive returning fluid under pressure forced therealong from said cylindrical bore, an annular return passage formed in said cylindrical bore about said valve guide, transverse passages radially spaced in said valve guide connecting said intermediate chamber and said annular return chamber, and a return passage communicating with said annular return chamber for leading returning lubricant fluid back to said lubrication system to allow said shut down seal to close in accordance with the stopping time of said compressor.

6. In a control for a shut down seal system on elastic fluid compressors operated by a lubrication system thereon having a main service pump and an auxiliary pump including, a casing, a rotor shaft extending through said casing, a seal collar fixedly connected to said rotor shaft, a shut down seal movably mounted on said rotor shaft for air tight engagement with said seal collar, a lever pivotally connected to said shut down seal for moving it into and out of engagement with said seal collar, cylinder and piston elements on said compressor for operating said lever responsive to lubricant fluid under pressure from said lubrication system, a conduit for conducting lubricant fluid under pressure to and from said cylinder element and an air valve comprising, inlet means formed on said valve and connected in said conduit, a cylindrical bore in said valve communicating with said inlet means through a valve port, outlet means from said cylindrical port and connected to said conduit, a valve guide in said bore and having an elongated valve stem slidably mounted therein, said valve stem provided with a valve head at one end for engagement with said valve port, resilient means mounted about said valve stem for maintaining said valve port normally open, a chamber in said air valve provided with a diaphragm thereacross and connected to the other end of said valve stem for moving said valve head into engagement with said valve port responsive to air pressure delivered to said chamber on at least one side of said diaphragm, the combination with said air valve of, an inlet port communicating with said chamber on one side of said diaphragm, an air receiver having sufficient air pressure therein for initially closing said air valve, a conduit connecting said air receiver with said inlet port so that said air pressure may act against the diaphragm, means in said conduit normally closed when the compressor is in operation, adjustable means on said air valve to equalize the pressure in said chamber to atmospheric pressure, means on said air receiver to constrict the amount of pressure supplied to said receiver when the initial pressure drops therein, said adjustable means set to allow more air to bleed from said chamber than can be passed to said air receiver whereby when the means in said conduit opens to pass air pressure to said chamber the air valve will be closed initially by said pressure but will slowly open on equilization of the pressure to allow the shut down seal to close in accordance with the stopping time of said compressor.

7. In the control for the shut down seal system as claimed in claim 6 wherein said adjustable means on the air valve comprises, at least one bleeder opening, a bleeder screw for regulating the size of said bleeder opening, and a lock nut for locking said bleeder screw in the predetermined timing position to allow the air valve to open whereby the shut down seal will close in accordance with the stopping time of the said compressor.

8. In the control for the shut down seal system as claimed in claim 6 wherein said means to constrict the amount of pressure supplied to said air receiver is a restricted orifice on the upstream side of the air receiver which coacts with the adjustable means.

9. In a control for a shut down seal system on elastic fluid compressors operated by a lubrication system thereon having a main service pump and an auxiliary pump including, a casing, a rotor shaft extending through said casing, a seal collar fixedly connected to said rotor shaft, a shut down seal movably mounted on said rotor shaft for air tight engagement with said seal collar, a lever pivotally connected to said shut down seal for moving it into and out of engagement with said seal collar, cylinder and piston elements on said compressor for operating said lever responsive to lubricant fluid under pressure from said lubrication system, a conduit for conducting lubricant fluid under pressure to and from said cylinder element and an air valve comprising, inlet means formed on said valve and connected in said conduit, a cylindrical bore in said valve communicating with said inlet means through a valve port, outlet means from said cylindrical port and connected to said conduit, a valve guide in said bore and having an elongated valve stem slidably mounted therein, said valve stem provided with a valve head at one end for engagement with said valve port, resilient means mounted about said valve stem for maintaining said valve port normally open, a chamber in said air valve provided with a diaphragm thereacross and connected to the other end of said valve stem for moving said valve head into engagement with said valve port responsive to air pressure delivered to said chamber on at least one side of said diaphragm, the combination with said air valve of, a solenoid valve in said conduit on the upstream side of said valve for closing said conduit to prevent lubricant fluid from returning when the pressure in the lubrication system drops below a predetermined minimum when the power is on, return means formed in said air valve to coact with said solenoid valve to allow the lubricant to be returned slowly to the lubrication system, an air inlet port communicating with said chamber, means connected to said air inlet port to deliver air to said chamber on one side of said diaphragm when there is complete power failure to force said valve head to close said valve port, means in said inlet port for equalizing the pressure in said chamber to atmospheric pressure to allow said valve port to open responsive to the resilient member about the valve stem, means on said air receiver to restrict the pressure supplied thereto to allow said equalizing means and said return means to pass the lubricant fluid slowly back to the lubrication system whereby the shut down seal will close in accordance with the stopping time of said compressor.

10. In a control for a shut down seal system on elastic fluid compressors operated by a lubrication system thereon having a main service pump and an auxiliary pump including, a casing, a rotor shaft extending through said casing, a seal collar fixedly connected to said rotor shaft, a shut down seal movably mounted on said rotor shaft for air tight engagement with said seal collar, a lever pivotally connected to said shut down seal for moving it into and out of engagement with said seal collar, cylinder and piston elements on said compressor for operating said lever responsive to lubricant fluid under pressure from said lubrication system, a conduit for conducting lubricant fluid under pressure to and from said cylinder element and an air value comprising, inlet means formed on said valve and connected in said conduit, a cylindrical bore in said valve communicating with said inlet means through a valve port, outlet means from said cylindrical port and connected to said conduit, a valve guide in said bore and having an elongated valve stem slidably mounted therein, said valve stem provided with a valve head at one end for engagement with said valve port, reilient means mounted about said valve stem for maintaining said valve port normally open, a chamber in said air valve provided with a diaphragm thereacross and connected to the other end of said valve stem for moving said valve head into engagement with said valve port responsive to air pressure delivered to said chamber on at least one side of said diaphragm, the combination with said air valve of, a solenoid valve in said conduit on the upstream side of said valve for closing said conduit to prevent lubricant fluid from returning when the pressure in the lubrication system drops below a predetermined minimum when the power is on, return means formed in said air valve to coact with said solenoid valve including an intermediate chamber formed in said valve guide about said valve stem to receive returning lubricant fluid forced therealong under pressure from said cylindrical bore, an annular return passage formed in said cylindrical bore about said valve guide, transverse passage radially spaced in said valve guide connecting said intermediate chamber and said return chamber, and a return passage communicating with said annular return chamber for leading said lubricant fluid back to said lubrication system, an air inlet port communicating with said chamber on one side of said diaphragm, an air receiver having sufficient air pressure therein to initially close said air valve, a conduit connecting said air receiver with said inlet port, a solenoid valve normally closed when the power is on but open when the power fails positioned in said conduit to allow the air pressure in said air receiver to act when the solenoid is open, an orifice means on said air receiver to constrict the amount of pressure that can be delivered thereto, and bleeder means in said air inlet port to coact with said restricting orifice and said return means to allow the pressure in said chamber to equalize to atmospheric pressure whereby the air valve will open slowly and the lubricant fluid will be returned to the lubrication system to allow the shut down seal to close in accordance with the stopping time of said compressor.

WILLIAM H. CHURCH.

REFERENCES CITED

The following references are of record in the file of this patent:

UNITED STATES PATENTS

| Number | Name | Date |
|---|---|---|
| 1,947,017 | McHugh | Feb. 13, 1934 |
| 2,236,274 | Rice et al. | Mar. 25, 1941 |